(12) United States Patent
Fiore (10) Patent No.: US 10,788,158 B2
(45) Date of Patent: Sep. 29, 2020

(54) SPREADER FOR VIDEO-PHOTOGRAPHIC TRIPOD

(71) Applicant: CARTONI S.P.A., Rome (IT)

(72) Inventor: Alessandro Fiore, Rome (IT)

(73) Assignee: CARTONI S.P.A., Rome (IT)

( * ) Notice: Subject to any disclaimer, the term of this patent is extended or adjusted under 35 U.S.C. 154(b) by 0 days.

(21) Appl. No.: 16/331,501

(22) PCT Filed: Aug. 22, 2017

(86) PCT No.: PCT/IT2017/000178
§ 371 (c)(1),
(2) Date: Mar. 7, 2019

(87) PCT Pub. No.: WO2018/047207
PCT Pub. Date: Mar. 15, 2018

(65) Prior Publication Data
US 2019/0195419 A1 Jun. 27, 2019

(30) Foreign Application Priority Data

Sep. 8, 2016 (IT) .......................... 102016000090691

(51) Int. Cl.
*F16M 11/00* (2006.01)
*F16M 11/34* (2006.01)
*F16B 7/10* (2006.01)

(52) U.S. Cl.
CPC ............. *F16M 11/34* (2013.01); *F16B 7/105* (2013.01)

(58) Field of Classification Search
CPC ........ F16M 11/34; F16M 11/16; F16M 11/32; F16M 11/14
(Continued)

(56) References Cited

U.S. PATENT DOCUMENTS

| 1,495,458 | A | * | 5/1924 | Thalhammer | .......... | F16M 11/34 |
|  |  |  |  |  |  | 248/169 |
| 2,854,204 | A | * | 9/1958 | Growall | ................ | F16M 11/16 |
|  |  |  |  |  |  | 248/171 |

(Continued)

FOREIGN PATENT DOCUMENTS

| CN |  | 2241729 Y | 12/1996 |
| DE | 20 2007 012 585 U1 | | 12/2007 |

(Continued)

OTHER PUBLICATIONS

International Search Report and Written Opinion of the International Searching Authority for International Application No. PCT/IT2017/000178, dated Dec. 14, 2017, in 12 pages.

(Continued)

*Primary Examiner* — Steven M Marsh
(74) *Attorney, Agent, or Firm* — Knobbe, Martens, Olson & Bear, LLP (57) ABSTRACT

The invention relates to a spreader for video-photographic tripods comprising at least three arms pivoted, at one end, on a central spider, and provided, on the other end, with coupling means with the tripod, each one of the arms of said spreader being comprised of a housing or casing, within which there are slidably provided two telescopic stages, extendable in opposite directions relative to one another, said telescopicity stage extending far from said central spider providing, on its end outer with respect to said casing, said coupling means with the tripod, between said housing and said two telescopic stages being provided a mechanism for actuating the extension and retraction of said two telescopicity stages, said actuating mechanism being so realized that, for the extension of said two stages, it is required an action by an operator, while the retraction of said two stages (Continued)

is free as a result of a simple action of compression of said two telescopic stages.

6 Claims, 10 Drawing Sheets

(58) Field of Classification Search
USPC .......... 248/188.5, 188.7, 434, 435, 166, 167
See application file for complete search history.

(56) References Cited

U.S. PATENT DOCUMENTS

| | | | |
|---|---|---|---|
| 4,196,881 A | | 4/1980 | Davidson |
| 4,522,361 A | * | 6/1985 | Mooney ................ F16B 7/1454 |
| | | | 248/188.8 |
| 4,570,886 A | * | 2/1986 | Mooney ................ F16M 11/34 |
| | | | 248/186.1 |
| 5,503,357 A | * | 4/1996 | Johnson ................ F16M 11/16 |
| | | | 248/169 |
| 6,702,482 B2 | * | 3/2004 | Sherwin ................ F16M 11/34 |
| | | | 248/168 |
| 7,182,303 B2 | * | 2/2007 | Speggiorin ............ F16B 7/105 |
| | | | 248/168 |
| 7,543,784 B2 | * | 6/2009 | Lindsay ................ F16B 7/0433 |
| | | | 248/168 |

FOREIGN PATENT DOCUMENTS

| | | |
|---|---|---|
| DE | 20 2009 006 644 U1 | 7/2009 |
| EP | 1407184 B1 | 6/2006 |
| FR | 392933 A | 12/1908 |
| GB | 701937 | 1/1954 |

OTHER PUBLICATIONS

Search Report issued in Italian Application No. 102016000090691, dated Jul. 28, 2017, in 9 pages.
Search Report issued in Italian Application No. 102018000009733, dated Jun. 17, 2019, in 10 pages.
Office Action issued in Chinese Patent Application No. 201780055047. X, dated May 25, 2020.

* cited by examiner

SPREADER FOR VIDEO-PHOTOGRAPHIC TRIPOD

CROSS-REFERENCE TO RELATED APPLICATIONS

This application is the U.S. National Phase under 35 U.S.C. § 371 of International Application PCT/IT2017/000178, filed Aug. 22, 2017, which claims priority to IT Application No. 102016000090691, filed Sep. 8, 2016, the entire contents of each of which are incorporated by reference herein and made a part of this specification.

SUMMARY

The present invention relates to an improved spreader for video-photographic tripods.

More specifically, the invention concern a spreader of the above type, allowing a better flexibility in height and width of the pripod on which it is applied, and a better safety and strurdiness when used.

As it is well known, the currently available commercial tripod spreaders, which can be provided on the tripod substantially at the base or at a certain height along the same tripod, consist of extensible three arms, each having only one telescopicity stage.

Known tripod spreaders can of course assume all the intermediate configurations allowed by that telescopicity stage.

They also have two stable configurations, which correspond to two angular positions for each spreader arm, arms which can be extensible or telescopically lockable independently each other.

Specifically, this is a first configuration, or an open position (arms in a position at 90° with respect to the vertical axis y of the same spreader), thus allowing the tripod to be used for shooting; and a second configuration, or a closed position (with the spreader arms at 180° with respect to the vertical axis y of the same spreader), allowing the tripod to be closed for transportation or storage.

All the solutions currently available on the market are characterized, by virtue of the aforementioned structure, by a relatively limited variation range between the minimum and maximum opening of the single spreader arm, thus resulting in a limitation of the minimum/maximum height range of the same tripod.

Over the years, several solutions have been proposed to overcome this variation range limitation, which provide systems allowing to set different angular positions of the spreader arms, so that it is possible obtaining a range greater than the minimum or maximum height of the tripod, in any case using arms with a single extendable stage.

Such angular positions of the arms however become dependent on each other.

The main disadvantage of the known solutions is that they require a preliminary adjustment of the angular position of the spreader arms, thus making the tripod's adjustment less quick.

A further disadvantage of the known solutions is that, in most systems designed to solve the aforementioned problem, the angles that can be obtained are discrete and dependent on each other.

Such a feature could facilitate the breakage of the system, for example if the tripod was folded without disengaging the central locking mechanism. In fact, currently available solutions include, for locking the spreader arms in the desired position, mechanisms (such as a knob) that need to be unlocked to allow the arm to be adjusted and then locked again when the length of the set length of the spreader arm is reached.

Apart from of the complexity of the opening and adjustment operation of the spreader itself, it is clear that if it is tried folding the tripod without having operated on the mechanism of even one arm, it would risk breaking it.

In view of the above, the applicant has developed an improved spreader that, besides solving the above-mentioned problems, also provides additional advantages.

These and other results are obtained, according to the present invention, by proposing a spreader for a video tripod, which provides for each arm a double telescopicity, thus allowing a greater range of adjustment of the tripod itself.

It is a further object of the present invention that of providing a spreader having, for each arm, a telescoping extension mechanism that requires a special activation to adjust the spreader in the extension but does not oppose any resistance in the event of closure, even accidental, of one or more spreader arms.

Yet another object of the present invention is that of providing a spreader that can be provided on any tripod, with the attachments suitable for the three legs.

It is therefore specific object of the present invention a spreader for video-photographic tripods comprising at least three arms pivoted, at one end, on a central spider, and provided, on the other end, with coupling means with the tripod, each one of the arms of said spreader being comprised of a housing or casing, within which there are slidably provided two telescopic stages, extendable in opposite directions relative to one another, said telescopicity stage extending far from said central spider providing, on its end outer with respect to said casing, said coupling means with the tripod, between said housing and said two telescopic stages being provided a mechanism for actuating the extension and retraction of said two telescopicity stages, said actuating mechanism being so realized that, for the extension of said two stages, it is required an action by an operator, while the retraction of said two stages is free as a result of a simple action of compression of said two telescopic stages.

In a particularly preferred embodiment according to the present invention, said actuating mechanism for extension and retraction provides a linear guide, inside said casing, for the sliding of said two stages, at least one actuating mechanism provided with at least one sawtooth tooth, engaging on a rack realized on said two stages, provided with corresponding sawtooth teeth.

Always according to the invention, two racks can be provided on said two stages, on which two actuating mechanisms act, to be actuated simultaneously.

Furthermore, according to the invention, a single rack on each stage ca be provided, on which two actuating mechanisms act independently, so as to independently control the extension of the respective stage.

Preferably, according to the invention, said spreader is comprised of plastic material.

Furthermore, according to the invention, on the spider of said spreader it is provided a cord interacting with the tripod for quick-closing of the same.

BRIEF DESCRIPTION OF THE DRAWINGS

The present invention will now be described, for illustrative but not limitative purposes, according to its preferred embodiments, with particular reference to the figures of the enclosed drawings, wherein.

DETAILED DESCRIPTION

The two-stage extensible spreader 100 shown in FIGS. 1-8, as well as other embodiments thereof, some of which are illustrated in the figures, and other obvious to one skilled in the art when reading this description, and the enclosed figures, has the following advantages:

- wide variability between the minimum extension and the maximum extension of the tripod 200, as it has two telescopic stages for each arm 101;
- ease and quick adjustment of the arm length. It is possible, by holding down a single actuation, to extract and adjust both stages of the arm 101;
- automatic closure of spreader 100 arms 101, if subjected to compression, while they suitably resist to the traction;
- realization extremely economical, since the spreader (particularly in the embodiment shown) consists of five thermoplastic material molded features;
- tripod closure system by means of a cord (shown in FIG. 8) attached to the top of the spreader 100 by placing a suitable eyelet under the tripod 200 acting as a fulcrum: using the weight of the tripod 200 system and of the head (not shown) and the 2 angular freedom degrees on the two ends of each one of the arms 101 of the spreader 100, it is possible to close the tripod 200 by bringing the spreader 100 back into the closed angular position (arms at 180° with respect to the vertical axis y of the spreader) by simply pulling the cord.

As already said, in the embodiment illustrated in FIGS. 1-8, the double telescopicity spreader 100 consists of five features.

Particularly, a case 1 is provided, consisting of two identical half-shells, which are fastened by means of joints 11. Said closure allows rapid assembly/removal of the case 1 without employing screws or rivets. In addition, the case 1 has an internal profile acting as a track for extensible stages and a stop for each stage.

A first stage 2 has an quick coupling 21 (which can be of any type suitable for the specific tripod on which the spreader 100 must be provided, and not limited to the one shown in the figure), for a tripod 200 leg (only shown in FIG. 8), a rack 22, a sawtooth, and a stop 23.

A second stage 3 has one end on the hinge 31, engaging the spreader 100 star 102 and allowing two angular positions for each arm 101. Further, said second stage 3 includes a saw-toothed rack 32 and a stop 33, as for the first stage 2.

A linear guide 4 for both stages 2, 3 ensures the relative position between the two stages 2, 3, and the flexion and torsion stress resistance on the single arm 101.

An anchoring and actuation element 5 for both stages is provided in this embodiment.

This element 5 is constrained to the case 1 by means of two hinges 51, equidistant from the actuating button 52. Holding the actuating button 52, the element 5 is flexed, allowing the extension of stages 2 and/or 3. Once released the actuating button 52, the arm 101 is able to support traction loading.

Element 5 includes teeth 53, engaging with sawtooth racks 22, 23 of stages 2 and 3.

By said configuration, for opening a stage 2 or 3, it is necessary to act on the anchoring and actuation element 5, while for closure is not hampered by the rack 22, 32 and teeth 53 systems.

Figure 1:
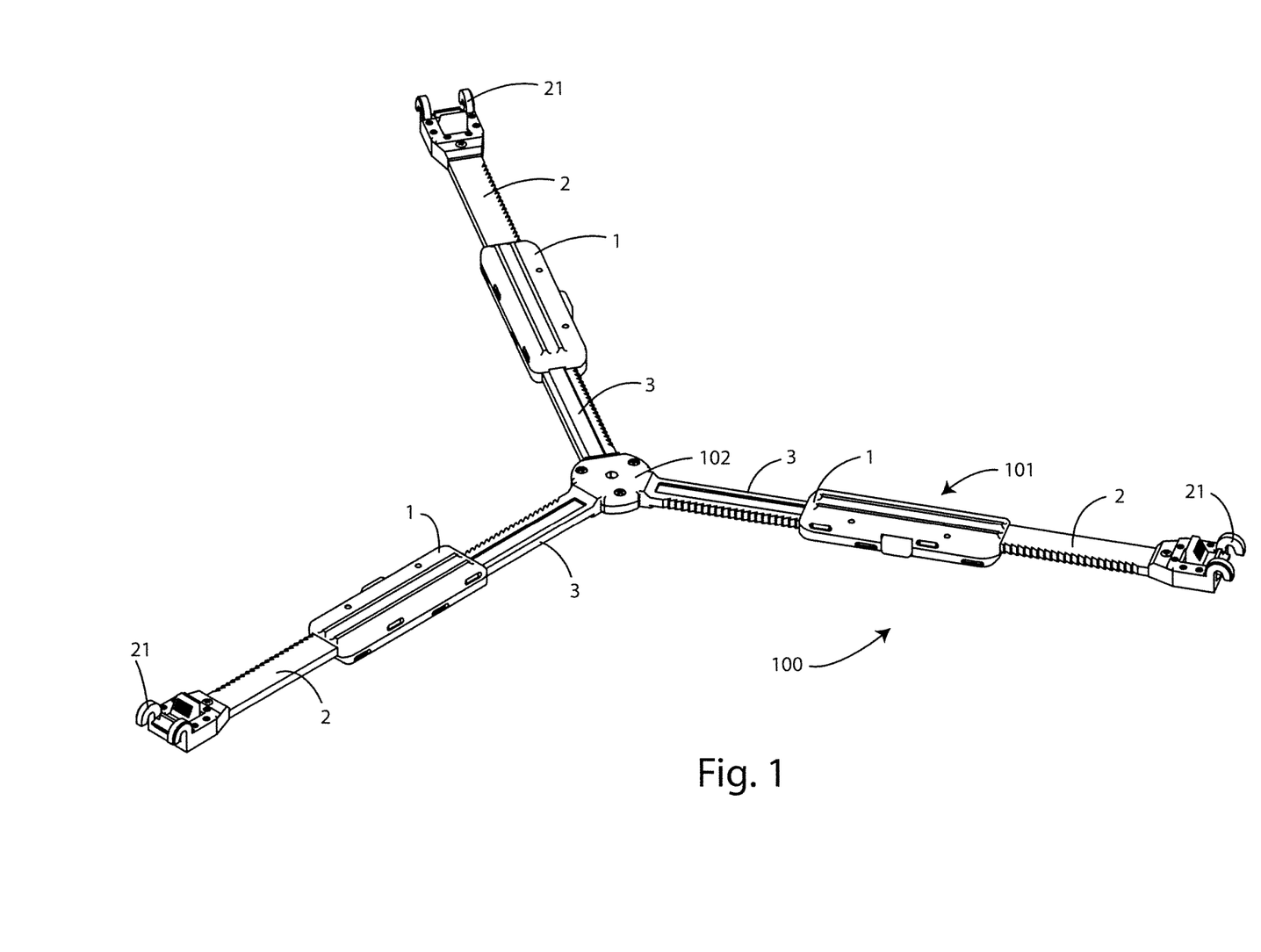
FIG. 1 is a perspective view of an embodiment of a double telescopicity spreader according to the invention.
Figure 2:
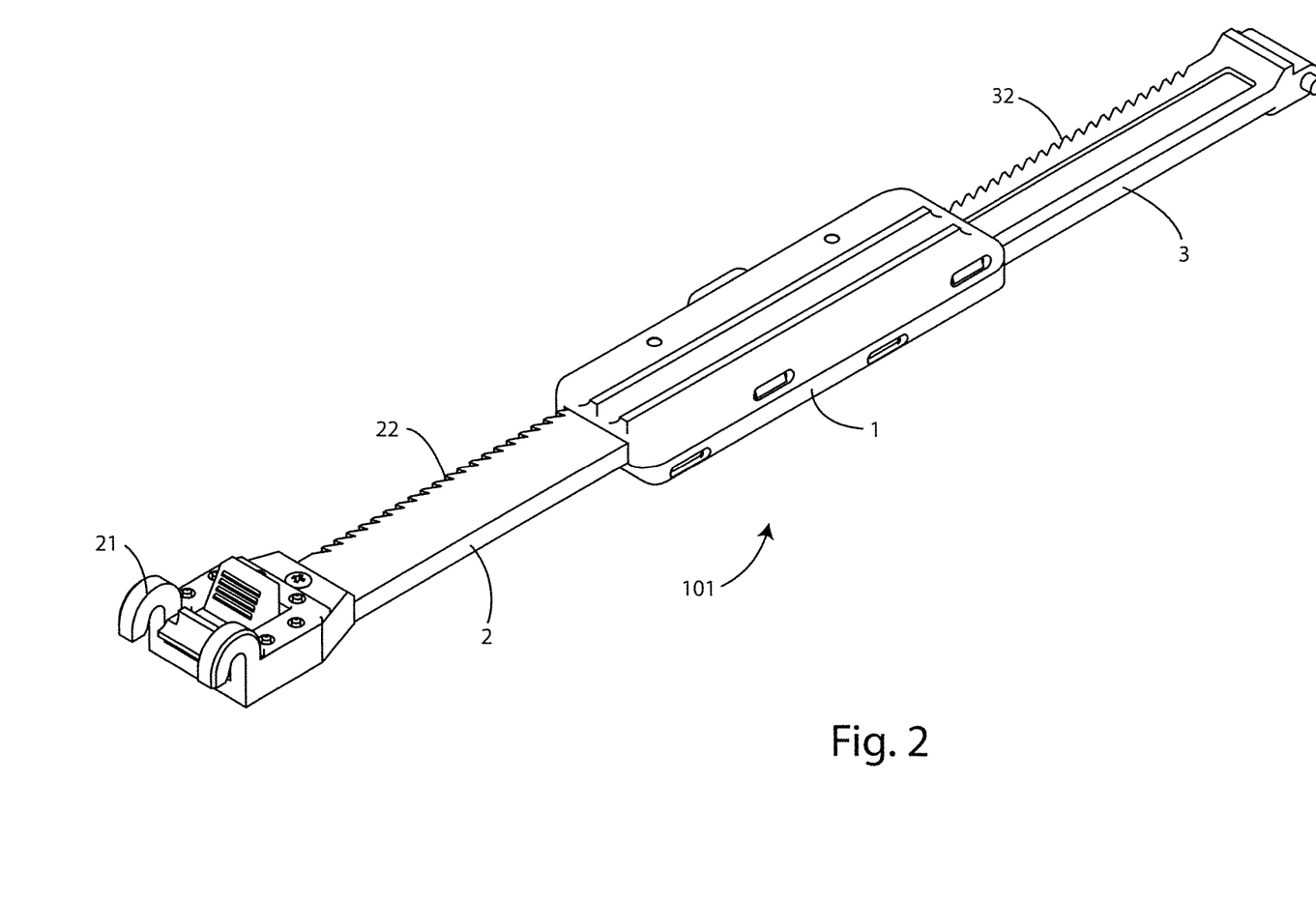
FIG. 2 is a perspective view of a single arm of spreader of FIG. 1.
Figure 3:
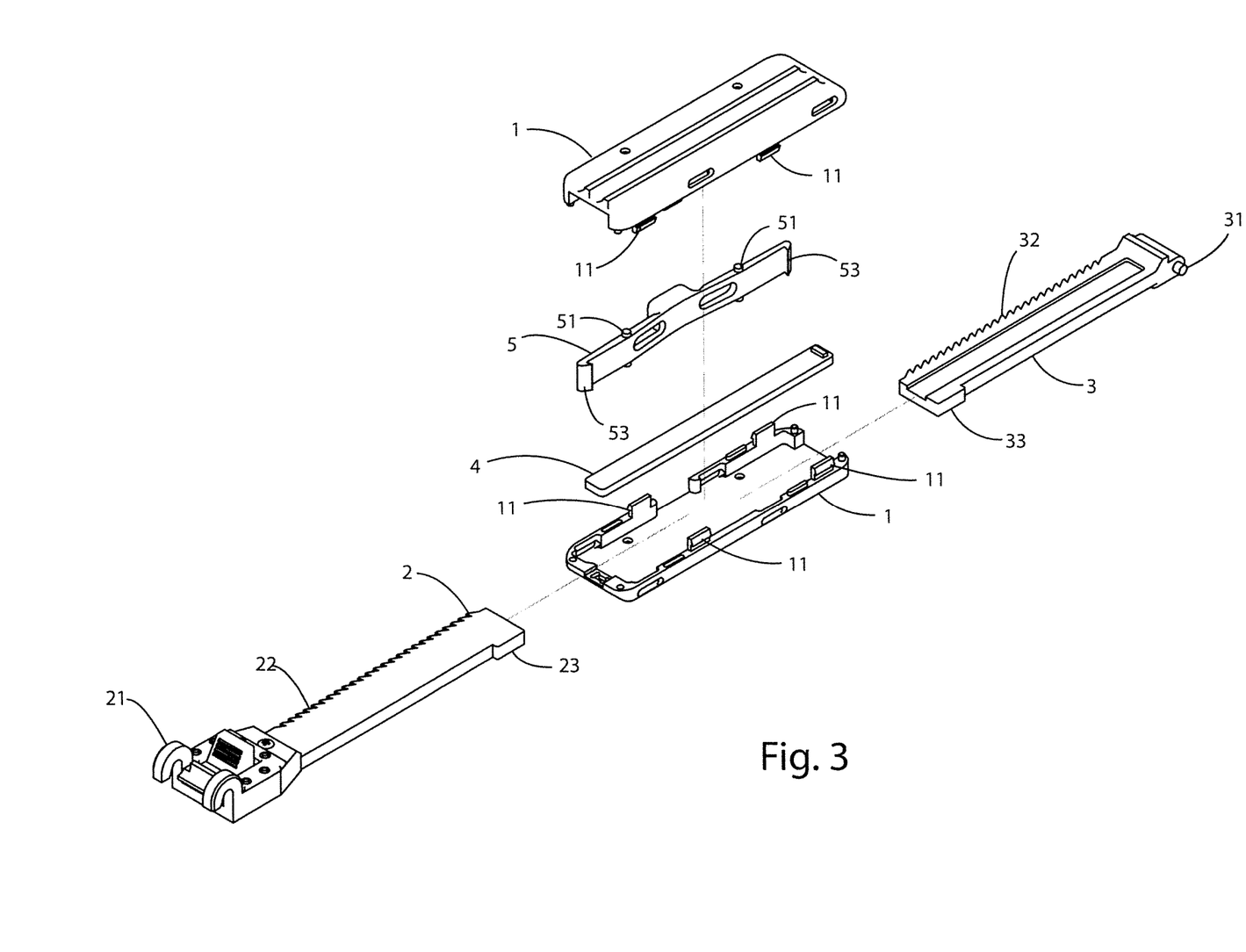
FIG. 3 is an exploded view of the single arm of FIG. 2.
Figure 4:
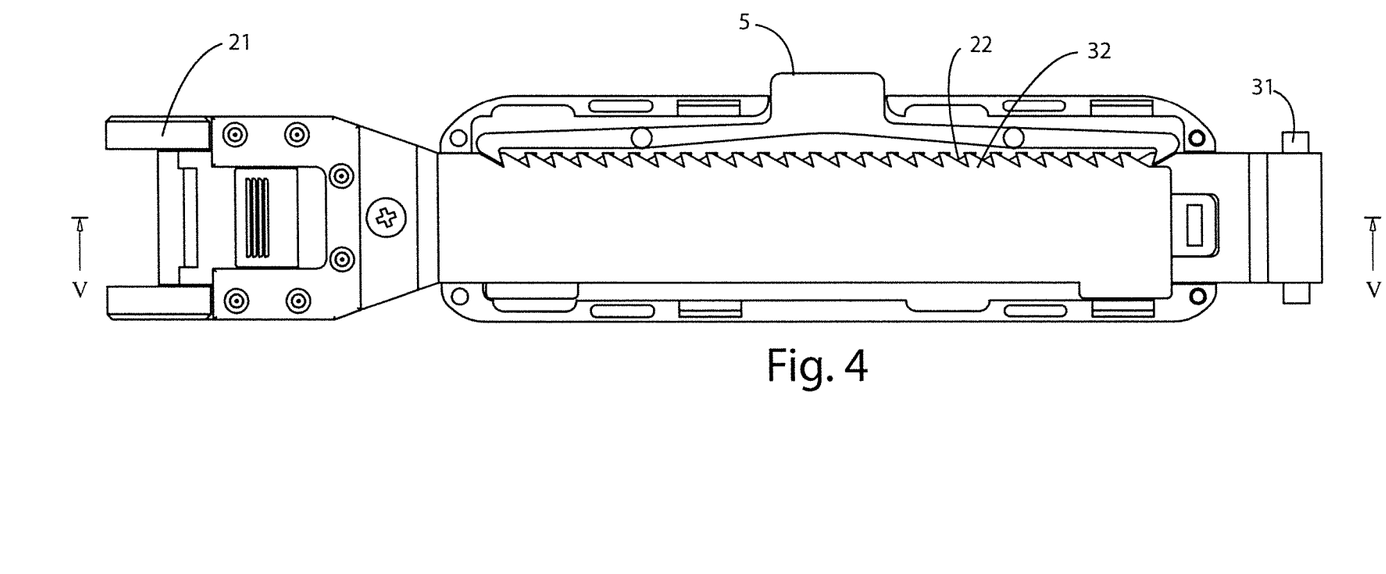
FIG. 4 is a top view of the single arm of FIG. 2 in an extended position.
Figure 5:
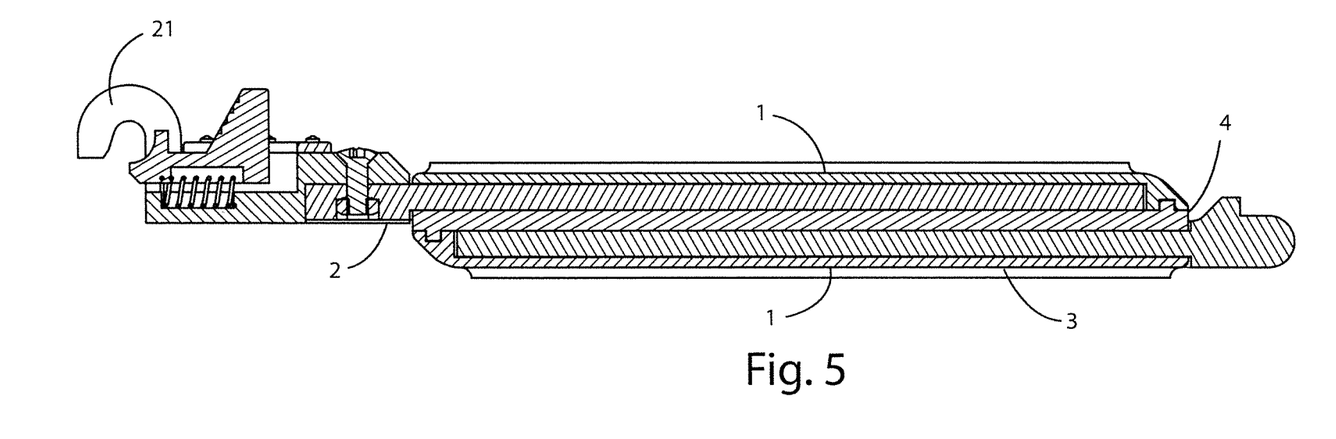
FIG. 5 is a section view taken along the line V-V of FIG. 4.
Figure 6:
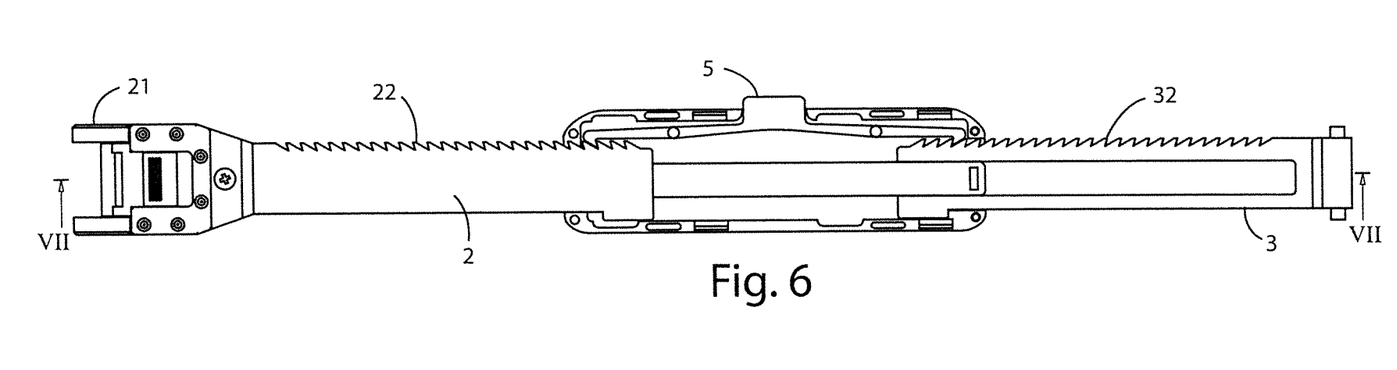
FIG. 6 is a top view of the single arm of FIG. 2 in an extended position.
Figure 7:
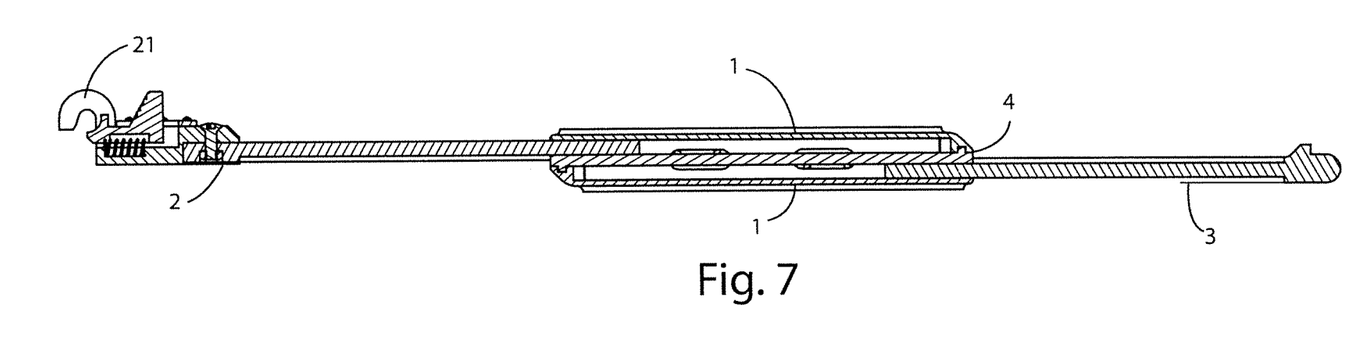
FIG. 7 is a section view taken along line VII-VII of FIG. 6.
Figure 8:
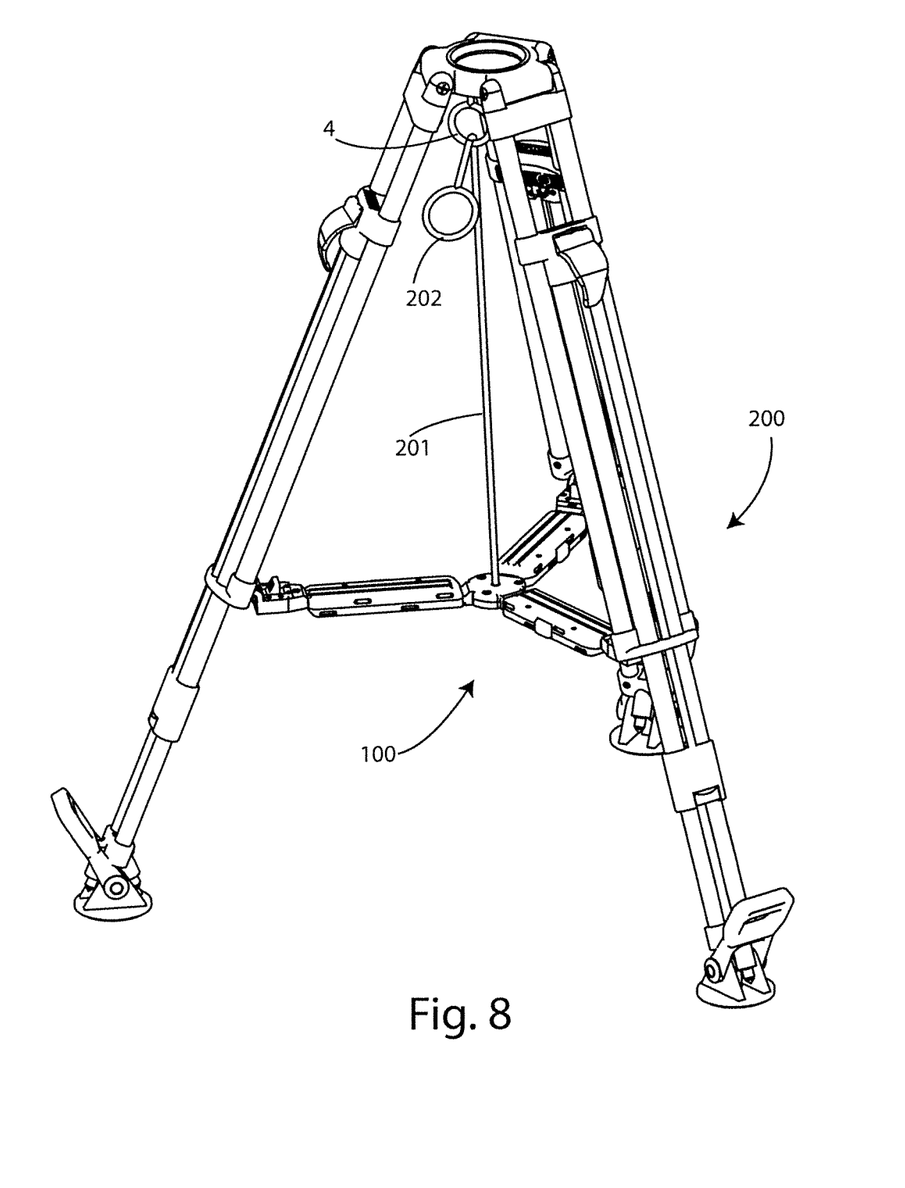
FIG. 8 shows the spreader of FIG. 1 applied at an intermediate height of a tripod.

FIG. 8 shows a tripod 200 according to the invention, on which a spreader 100 is applied as described with reference to previous FIGS. 1-7.

As indicated, on the tripod 200 star 100 system there is provided a cord 201, provided at one end with a grasp ring 202 and fastened to the spreader 100 star 102 at the other end. Said cord 201 passes through a ring 203 provided above the tripod 200, so that an operator, acting on the grasp ring 202, by a single movement closes the spreader 100.

Figure 9:
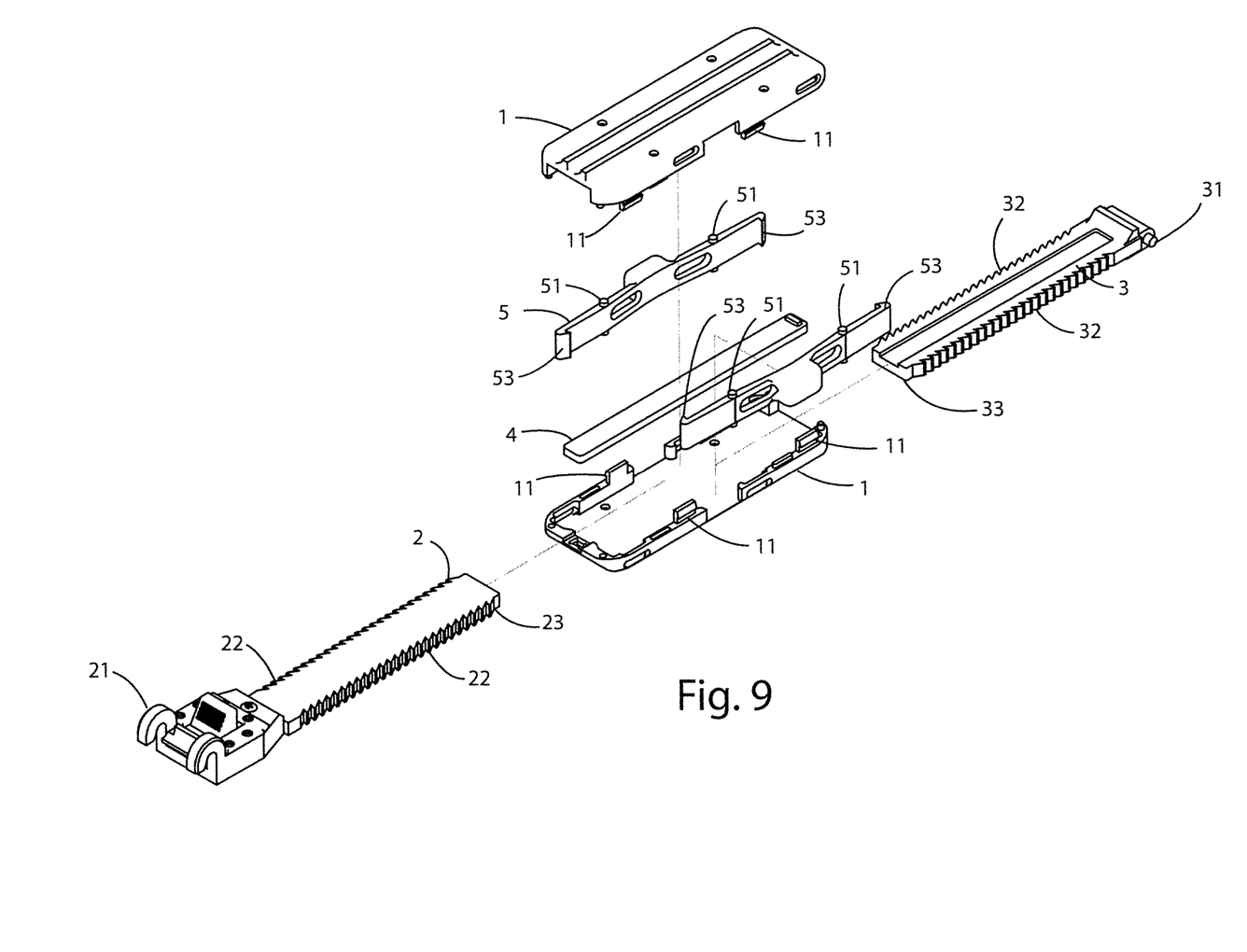
FIG. 9 is an exploded view of the single arm of a second embodiment of the double telescopicity spreader.
Figure 10:
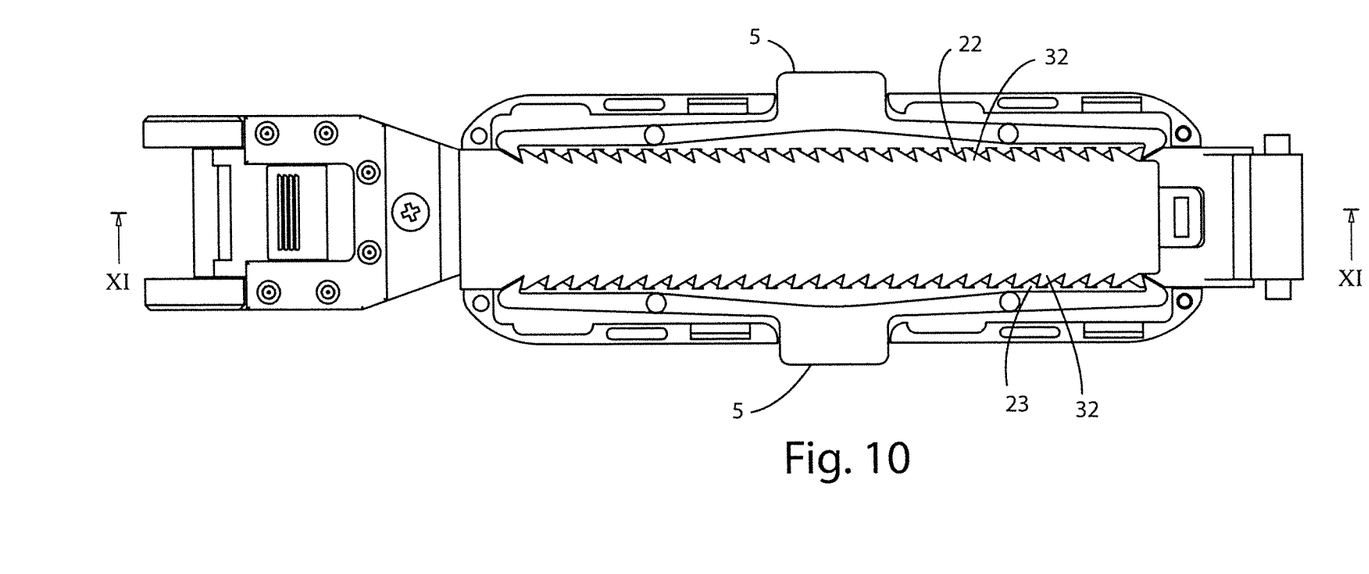
FIG. 10 is a top view of the single arm of FIG. 9 in an extended position.
Figure 11:
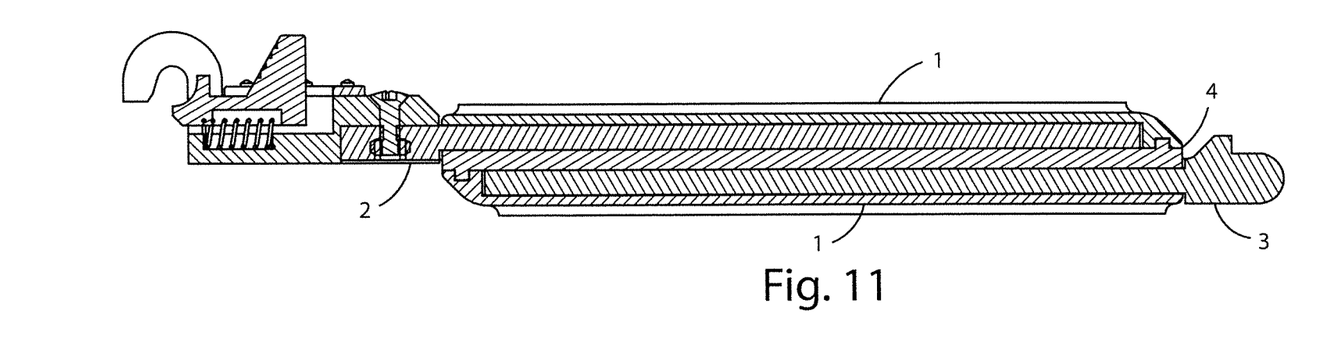
FIG. 11 is a section view taken along line XI-XI of FIG. 9.

FIGS. 9-11 show a second embodiment of a double telescopicity spreader according to the invention, in which the same numerical references will be used to indicate like or similar elements.

The embodiment shown in FIGS. 9-11 differs from the previous one simply because the anchoring and actuation element 5 provides for a double actuation structure, consequently acting on double racks provided on the respective stages 2 and 3.

In this way, to achieve the extension of stages 2 and/or 3 it is necessary to act on the two sides of the anchoring and actuation element 5.

Figure 12:
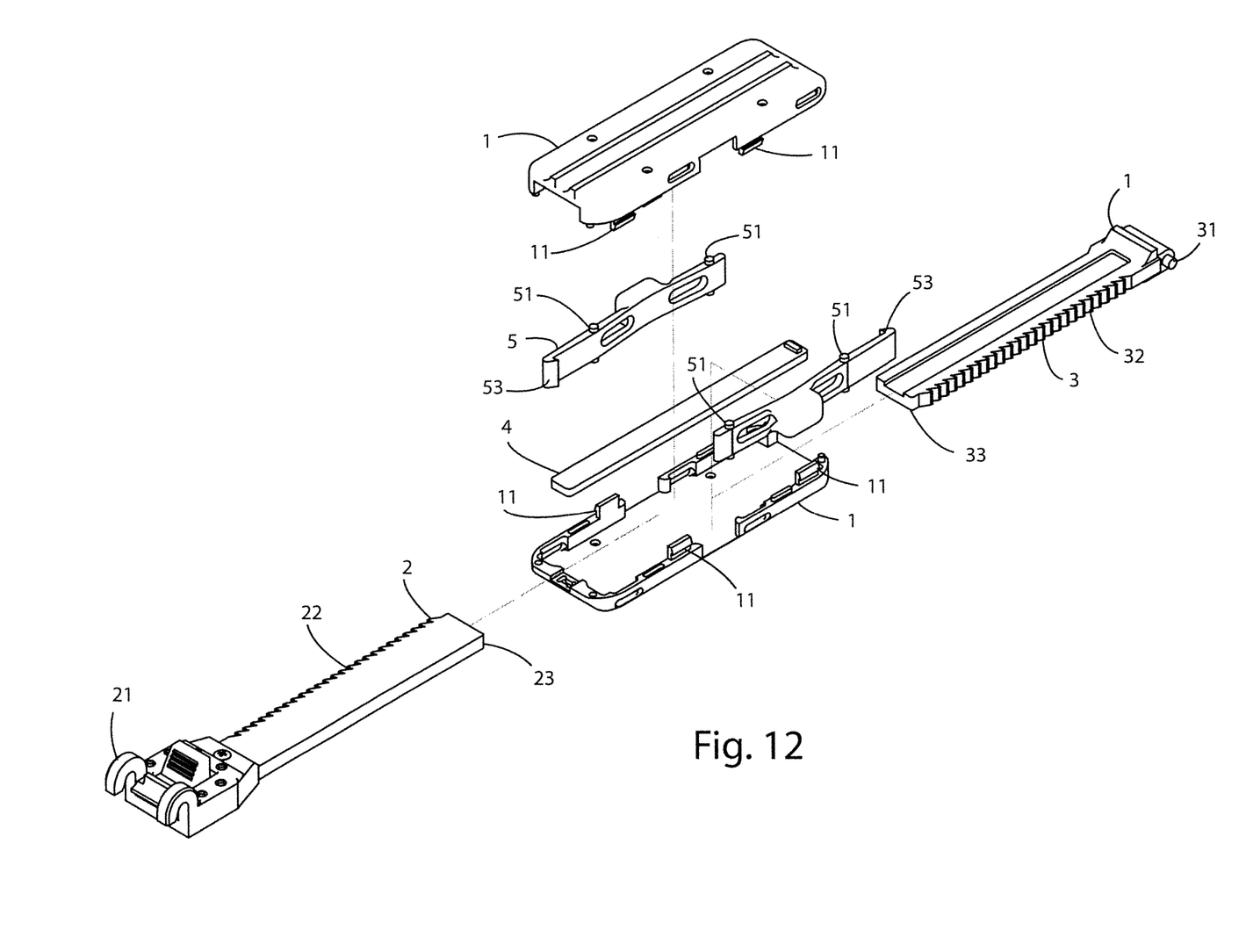
FIG. 12 is an exploded view of the single arm of a third embodiment of the double telescopicity spreader.
Figure 13:
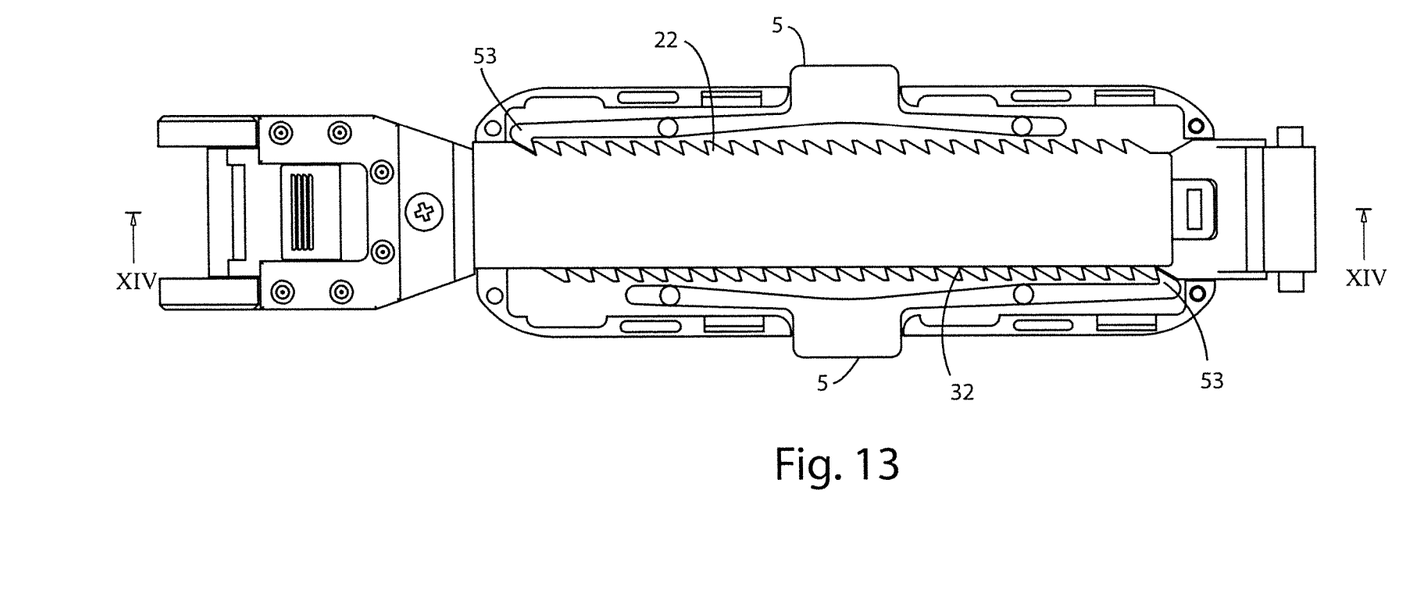
FIG. 13 is a top view of the single arm of FIG. 12 in an extended position.
Figure 14:
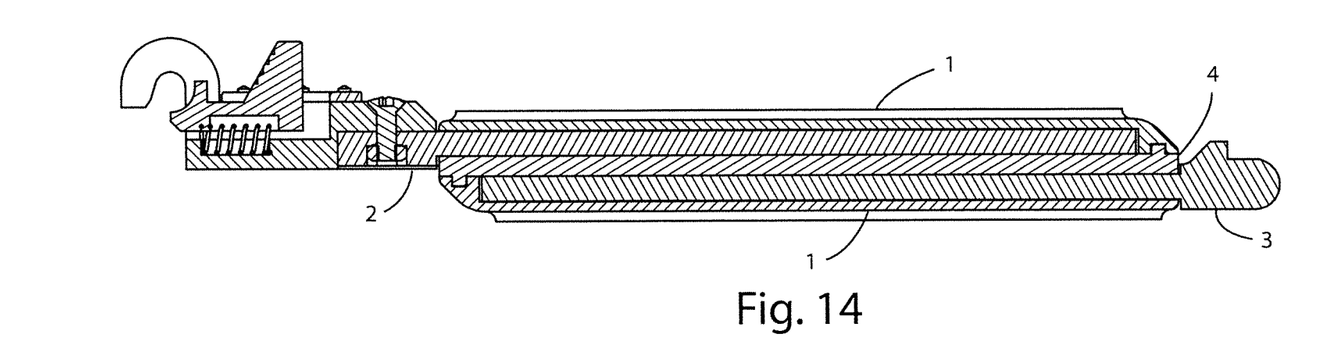
FIG. 14 is a section view taken along the line XIV-XIV of FIG. 13.

FIGS. 12-14 show a third embodiment of a double telescopicity spreader according to the invention, in which the same numerical references will be used to indicate like or similar elements.

The embodiment illustrated in FIGS. 12-14 differs from the previous one shown in FIGS. 1-7 only because the anchoring and actuation element 5 provides an independent double actuation element, which acts on the racks 22, 32 provided on the respective stages 2 and 3.

In this way, in order to obtain the extension of stage 2 or 3, one of the anchoring and actuation elements 5 must be actuated, which will have, respectively, only one tooth 53 in correspondence of the rack 22 or 32 on which it acts.

The present invention has been described according to its preferred embodiments, but it is to be understood that variations and/or modifications may be introduced by one skilled in the art branch without departing from the scope as defined in the enclosed claims.

What is claimed is:

1. Spreader for video-photographic tripods comprising at least three arms pivoted, at one end, on a central spider, and provided, on the other end, with coupling means with a tripod, each one of the arms of said spreader being comprised of a housing or casing, within which there are slidably provided two telescopic stages, extendable in opposite directions relative to one another, said two telescopic stages extending from said central spider providing, on its end outer with respect to said casing, said coupling means with the tripod, between said housing and said two telescopic stages being provided a mechanism for actuating the extension and retraction of said two telescopic stages, said actuating mechanism being so realized that, for the extension of said two telescopic stages, it is required an action by an operator, while the retraction of said two telescopic stages is free as a result of an action of compression of said two telescopic stages.

2. Spreader for video-photographic tripods according to claim 1, wherein said actuating mechanism for extension and retraction provides a linear guide, inside said casing for the sliding of said two telescopic stages, at least one actuating mechanism provided with at least one sawtooth tooth, engaging on a rack realized on said two telescopic stages, provided with corresponding sawtooth teeth.

3. Spreader for video-photographic tripods according to claim 2, wherein two racks are provided on said two telescopic stages, on which two actuating mechanisms act, to be actuated simultaneously.

4. Spreader for video-photographic tripods according to claim 2, wherein, a single rack on each stage is provided, on which two actuating mechanisms act independently, so as to independently control the extension of the respective stage.

5. Spreader for video-photographic tripods according to claim 1, wherein said spreader is comprised of plastic material.

6. Spreader for video-photographic tripods according to claim 1, wherein, on the central spider of said spreader it is provided a cord interacting with the tripod for quick-closing of the same.

* * * * *